United States Patent [19]

Smith-Johannsen

[11] 4,246,209
[45] Jan. 20, 1981

[54] FREEZING INORGANIC PARTICULATE SLURRIES

[75] Inventor: Robert Smith-Johannsen, Incline Village, Nev.

[73] Assignee: Ramu International, Incline Village, Nev.

[21] Appl. No.: 16,871

[22] Filed: Mar. 2, 1979

[51] Int. Cl.$^3$ .............................................. B01J 13/00
[52] U.S. Cl. ...................................... 264/28; 252/317
[58] Field of Search ........................... 264/28; 252/317

[56] References Cited

U.S. PATENT DOCUMENTS

| 3,177,161 | 4/1965 | Johannsen | 264/28 |
| 3,512,571 | 5/1970 | Phelps | 264/28 |
| 3,816,572 | 6/1974 | Roelofs | 264/28 |
| 3,885,005 | 5/1975 | Downing | 264/28 |

OTHER PUBLICATIONS

"Beyond The Ice Pack" by Julie Ann Miller, vol. 114, No. 12 and 15, Oct. 7, 1978, pp. 250-253.
"Cell On Ice" by Julie Ann Miller, Sep. 16, 1978, pp. 202-203.

Primary Examiner—John Parrish
Attorney, Agent, or Firm—Pennie & Edmonds

[57] ABSTRACT

Aqueous particulate slurries or suspensions containing a small amount of a freeze sensitive ceramic sol are frozen by supercooling the aqueous slurry prior to freezing. The process includes the use of lithium ions in the slurries with or without supercooling.

23 Claims, No Drawings

FREEZING INORGANIC PARTICULATE SLURRIES

BACKGROUND OF THE INVENTION

Freezing a slurry of particulate ceramic material to form ceramic product has been disclosed in U.S. Pat. Nos. 3,177,161; 3,512,571; 3,816,572 and 3,885,005. The production of these ceramic structures in accordance with the prior art by mixing an aqueous freeze-sensitive silica sol with the ceramic grains to form an aqueous slurry, freezing the slurry to form a frozen body, thawing and drying the body, and then firing the dried body has resulted in products which often contain large voids which adversely affect the strength of the ceramic product. The general uniformity of the products is also inconsistent and generally of poor quality which in turn adversely affects its desired properties such as thermal conductivity and thermal shock resistance. The products also frequently rupture, crack or distort during firing. Such products also tend to expand beyond the tolerances desired during the firing step or during subsequent use.

These deficiencies in the resulting ceramic products are believed to be caused by nucleation at one of the cooling surfaces due to contact with an ice crystal or with the mold surface that has a nucleation temperature higher than that of the slurry itself as the dispersion is cooled to its freezing point. This nucleation is believed to cause large ice crystals to grow out from these points and eventually entrap the last remaining liquid, resulting in rupture, cracking, weak and, non-uniform ceramic structures.

Many attempts have been made to overcome this problem such as thorough waxing of the molds, the use of different mold materials, thorough cleaning of mold surfaces, even with acids, but the problems still persisted.

SUMMARY OF THE INVENTION

This invention relates to a process which substantially eliminates the problems discussed above by supercooling an inorganic particulate or a ceramic slurry containing a freeze sensitive ceramic colloidal sol to a temperature where it spontaneously nucleates the slurry resulting in the formation of a very large number of ice crystals that are consequently very small thus producing a ceramic structure that is very uniform throughout. The invention further includes the addition of lithium ions to the freezing media with or without supercooling.

DETAILED DESCRIPTION AND PREFERRED EMBODIMENTS

The various inorganic particles that can be used according to this invention including, without limitation, aluminas such as mullite and tabular alumina, silicas such as fused silica, magnesia, chromite, spinels such as chromite spinel, kyanite, carbomul, zirconia, mica, carbon, graphite, molydisulfide, uranium oxide, thoria, titania, and clays. The invention however is broadly applicable to suspensions of inorganic particles in general including other metal compounds. Mixtures may be used if desired.

The particle size of the ceramic is not critical. Best results seem to have been obtained to date when the majority of the particles, or 40–50% of them, are below about 200 mesh. Small particle or grain size seems to be particularly advantageously when using zirconia. Much smaller particle sizes can also be used even in a colloidal size. The ultimate particle size and size distribution will depend on some extent on the end use of the structures and the properties desired therein.

The inorganic products produced according to this invention are porous and the size of the grains or particles employed in the slurries will to a large extent determine the degree of porosity. The products of the invention have a wide variety of uses depending to some extent on the type of particle being employed in the process. For example, if ceramic particles are employed, the products can be used in the same manner as ceramic and refractories are used such as fire brick, linings for furnaces in the steel, glass and other industries. They can also be used as filters, carriers for catalysts, thermal shock resistant dinnerware, grinding wheels, etc. When particles such as graphite and molydisulfide are employed their uses can include many of the above but adding thereto the lubrication properties of these materials. Generally the products are useful in any area where porosity is desired or in areas where porosity is not desired but is not detrimental.

The freeze-sensitive colloidal ceramic sols useful according to this invention are well known and include colloidal ceramic sols, such as disclosed in the Smith-Johannsen U.S. Pat. Nos. 3,177,161 and U.S. Pat. Nos. 3,512,571 to Phelps, 3,816,572 to Roelofs and 3,885,005 to Downing et al. A freeze-sensitive sol is one which, when frozen, will break down and no longer exist as a sol or colloidal suspension when thawed. Both cationic and anionic silica sols can be used with the anionic preferred at least with alumina and zirconia refractories. Ammonia stabilized silica sols, such as Dupont's AM LUDOX, may be advantageous where elimination of sodium is desired. Other freeze-sensitive colloidal ceramic sols, such as zirconia and magnesia sols, can also be used. Silica sols have been used because they are readily available on the market. Although not necessarily preferable due to insufficient experimental data to date, most present experiments mainly utilize a freeze-sensitive sodium stabilized colloidal silica sol having about 30% colloidal silica supplied by Nalco Chemical Company due to its availability.

The total amount of sol stabilizer such as sodium ammonium and/or lithium should be sufficient to stabilize the sol but not be so high as to render the sol non-freeze sensitive or to lower the strength of the fired silica or other ceramic contained in the sol when fused or fired or to lower the strength of the fused or fired product to an unacceptable level. This can readily be determined by routine experimentation by one skilled in the art. For example a mole ratio of silica to lithia of about 85 in a lithium stabilized silica sol works quite well but when the ratio is lowered to about 48 the sol appears to lose some freeze sensitivity resulting in weaker bonds. The optimum amounts have not as yet been determined.

Generally, the sodium stabilized silica sol are quite adequate to practice the invention disclosed herein. With some inorganic particles, namely zirconia and magnesia, some adjustments can be made to improve the results. These adjustments are be desirable to improve pot life and to preserve the distribution of particle sizes during the filling operation so that an optimum degree of uniform packing can be obtained.

When zirconia, for example is mixed with a negatively charged sodium stabilized silica sol (DuPont Ludox HS-40) it is well wetted and the particles quickly segregate. It is believed that this segregation occurs because the sol particles and the zirconia particles are so charged to prevent or minimize particle association. The zirconia particles generally have a charge of about −20 m.v. (zeta potential) in deionized water while the above Ludox particles are even more highly charged. To overcome particle segregation problem, the zeta potential of the particles comprising the various mixes can be altered.

One way of altering the zeta potential is to reduce the pH of the above Ludox from about 10 to about 8 by adding dilute HCl which lowers the zeta potential of the silica sol particles and rendering them less stable. Under these conditions, the silica particles begin to precipitate onto the ceramic (zirconia) particles creating a degree of association between all of the particles of the mix and segregation of coarse and fine ceramic particles such as zirconia is greatly inhibited. The acid can also be added to the inorganic particles or to a mixture of the sol and particles. The amount of acid is that which is sufficient to prevent settling or segregation of the particles. In practice, it is advantageous to add the acid directly to the sol. With zirconia, the amount of acid found practical to accomplish the result is about 0.6 percent by weight (based on the total weight of zirconia) of a 37 percent HCl solution. If such a problem is encountered with other inorganic particles the zeta potential can be measured and appropriate adjustment with acid or alkali to alter the zeta potential can be made in such a manner as to insure particle association.

Zirconia, and especially magnesia, also appear to react with the sodium stabilizer (and also ammonia somewhat) to cause limited pot life. In fact, the reaction with magnesia is so rapid that mixing itself becomes difficult. The use of a lithium stabilied silica sol was found to eliminate this reaction to the extent that magnesia dispension could be readily mixed and cast without concern of short pot life. The use of lithium stabilized sols also overcomes the particle segregation problem referred to above with respect to zirconia. Thus it may not be necessary to adjust the zeta potentials of the particles if a sol having the requisite zeta potential can initially be used.

When the lithium stabilized silica sol was used with magnesia and zirconia another new and very significant property was observed. These sols inhibited ice crystal growth even in the absences of supercooling. In fact, when nucleation was deliberately initiated, in the case of magnesia dispersion containing lithium ions, from the surface with an ice crystal, no macro or large crystal growth was detectable for more than two millimeters from the initiation site. Thus the use of lithium stabilized ceramic sols not only solved the pot life problems and particle segregation problems of zirconia and magnesia but has been found extremely advantageous for producing small uniform ice crystals during the freezing step with regard to all inorganic dispersions. The use of a lithium stabilized ceramic sol in combination with supercooling has been found most advantageous.

When using lithium in the inorganic particle slurries containing a freeze sensitive ceramic sol, it is of course most practicable to employ a lithium stabilized ceramic sol available on the market. A silica sol having a silica to lithia ratio of 85 worked quite well, however this sol, DuPont's Lithium Polysilicate 85, is not being marketed today. One lithium stabilized sol which is available today contains a silica to lithia ratio of about 48 (DuPont's Lithium Polysilicate 48). This amount of lithia however minimizes the freeze sensitivity of the sol and when used along produced fired products having weaker bonds. This commercial lithium stabilized sol can be used however by using it in admixture with a sodium or preferably an ammonia stabilized sol. A 50—50 mixture has worked well but the optimum has not as yet been determined. It is the presence of the lithium ion which produces the surprising ice crystal growth inhibition rather than the absence of sodium or ammonia. Thus lithium ions can be added to the slurries by the addition of ionizable lithium compounds such as lithium chloride, lithium hydroxide, lithium sulfate, lithium succinate and so forth. It is preferred to add the lithium ions to the ceramic sol. The amount of lithium ions added to an inorganic particle slurry should be sufficient to inhibit ice crystal growth to the desired degree but insufficient to adversely affect the freeze sensitivity of the sol. This can be determined by routine experimentation with respect to any particular system being frozen. Only a very small amount of lithium ion is necessary to inhibit ice crystal growth. Higher amounts may however be required to increase the pot life when magnesia is used as can be observed in Examples below.

To accomplish the supercooling and substantial instantaneous freezing, it is not a simple matter of inserting a mold filled with the slurries into a cold freezing media even at −40° or −60° F. This invention includes a process of insuring supercooling of the ceramic slurries by treating the mold with a hydrophobic liquid such as xylene, mineral spirits, or percholorethylene to cover at least the entire working surface of the mold, and inserting the slurries or suspensions into the mold while it is still wet. This can be accomplished by simply dipping the mold in the hydrophobic liquid. The mold can then be closed and the slurry frozen. It is also advantageous to cover the aqueous slurry or suspension in the mold with a thin layer of the hydrophobic liquid. The mold itself is preferably of light weight and of low mass relative to the freezing media and the ceramic or particulate slurry being frozen. The mold and freezing media should also have a high thermal conductivity. Although the freezing temperature can be varied, it should be sufficiently low to insure supercooling and a rapid freeze. The temperature of about −45° to −50° F. can be used. When lithium is used temperatures of about −10° F. can advantageously be used.

When producing large articles, supercooling may only occur to a certain depth from the mold surface toward the center of the slurry because all of the heat within the center cannot be removed before freezing of a portion of the slurry closer to the mold. When large articles are to be made it is thus advantageous to cool the entire slurry to near the freezing point before inserting it into the freezing media to insure complete supercooling. The presence of lithium ions in large slurries is also advantageous.

The supercooling can also be carried out without the use of mold such as by extruding cylinders, sheets or films of the aqueous slurry or suspension on a belt treated with the hydrophobic liquid and then into the hydrophobic freezing media. The transport through the freezing media can be between a pair of belts and the process can be continuous. The terms "mold" as used herein is intended to include any structure for supporting and/or encompassing the slurries or suspensions.

Supercooling of the slurry to a temperature where it spontaneously nucleates results in a structure that is uniform throughout. At the time of nucleation not all the water freezes because the heat of fusion raises the temperature back to the freezing point. However, as cooling proceeds further, ice crystal growth is completed from all of these nucleation sites at substantially the same time. The structure that develops is therefore much more uniform and fine grained regardless of the thickness of the structure to be produced or frozen.

Random tests made on some of the freezing steps set forth herein indicate that the temperature of supercooling is about 4 degrees below the freezing temperatures of the aqueous slurry.

Various freezing media can be used to freeze the slurry structures such as those described in the above-mentioned patents. A hydrophobic freezing media such as freon or perchloroethylene is advantageously used to prevent penetration of the freezing media into the aqueous slurries to prevent the growth of large or variable sized ice crystals, and to insure supercooling.

The various ceramics useful according to this invention have different and known firing or sintering temperatures in conventional refractory processes. For example, alumina is generally fired at a temperature of 1400° C. or slightly above, and zirconia at about 1700° C., in conventional refractory processes. As a general rule, freeze-cast ceramics are most advantageously fired at about 50% to 65% of their melting temperature. Thus, when firing freeze-cast ceramics, alumina is advantageously fired at about 1250° C. while zirconia is advantageously fired at about 1400° C.

Other inorganic structures can be sintered at their known or determined sintering temperatures. The temperature used and time of heating should be sufficient to bond the particles together into a strong integral structure but insufficient to significantly reduce or adversely affect the desired porosity or uniformity of the product. Examples of such temperatures are given, for example, in U.S. Pat. No. 3,177,161.

The molds or patterns are usually made of lightweight steel or aluminum if more thermal conductivity is desired. The wetting of a mold with a hydrophobic liquid to aid in supercooling can also act as a release agent.

The slurries should be as free from entrapped air as practical. Entrapped air can be avoided to some extent in the manner by which the slurries are first mixed, and any entrapped air can be removed in various known manners, such as using long periods of holding time, vibration, or vacuum treatment techniques.

After freezing, the frozen slurry structures are removed from the mold, thawed and dried. Although various manners of thawing and drying can be employed, the thawing and drying can be accelerated by the use of heat. The use of a conventional drying oven has been found satisfactory for this purpose.

After selection of the specific particles to be formed into a structure, they can be mixed in the conventional manner having due regard to particle size, and the freeze-sensitve colloidal ceramic added to each of the dried ceramic materials selected. The freeze-sensitive colloidal ceramics are contained in water and the solid colloidal content may range from 15% to 50% solids. Thus, the addition of the freeze-sensitive colloids to the dried ceramic material usually automatically adds the necessary water for handling. For example, a mix commonly used in slip casting containing up to about 10% water, having a consistency somewhat like pancake batter can be poured into a mold or injected by simple means. This can readily be accomplished by maintaining the proper consistency of the ceramic slurries either by using high solid content freeze-sensitive colloidal ceramic sol or by removing water prior to freezing. One manner of accomplishing this mixing is to dry mix the ceramic grain in a ribbon blender and add the freeze-sensitive ceramic sol together with its liquid component, slowing the ribbon blender and continuing until thorough mixing is obtained. The particulate suspensions or slurries, should have a particle content sufficient to insure particle to particle contact during the freezing step as described in U.S. Pat. No. 3,177,161. If the particles are dispersed too thinly, no structure will be formed when the ice melts. The amount of water is desirably held to a minimum practical amount for economic reasons.

The amount of the freeze-sensitive ceramic sol can be as reported in the above-noted U.S. patents. The most suitable percentage appears to be about 15% by weight of the colloidal ceramic sol (30% solids) based on the weight of the dried inorganic particles.

EXAMPLE 1

Alumina Mix (19 kilograms)—crucible

Tabular Alumina Alcoa, T61
28+48 Mesh, 55%
100 Mesh, 25%
325 Mesh, 20%
Sol 30% Colloidal Silica (NALCO), 14.3% by weight, pH about 10

EXAMPLE 2

Zirconia Mix (367.5 grams)—plate

Monoclinic Zirconia,
100 Zirconia, 50%
325 Zirconia, 50%
Sol 30% Colloidal Silica (NALCO) 12.5% by weight
Modified by 0.6% HCL. to pH 7.5

EXAMPLE 3

Zircon (380.5 grams)—plate

80 Mesh, 70%
325 Mesh, 30%
Sol 30% Silica (REMASIL SP-30), pH about 10, 11.7% by weight

EXAMPLE 4

Mullite-Remasil #60 (1180 grams)—plate
20 Mesh, 20%
70 Mesh, 20%
200 Mesh, 40%
325 Mesh, 20%
Sol 30% Silica (REMASIL SP-30), pH about 10, 14.6% by weight The above mixes are thoroughly blended and each mix has the consistency of thick pancake batter and can be poured and placed in a mold with the aid of a spatula. The molds are thoroughly wet with perchloroethylene. Each mix is placed in the mold while it is still wet with the perchlorethylene to the desired depth, about two inches. The top layers of each mix is then covered with a layer of perchloroethylene freezing liquid, the molds closed and molds inserted entirely in perchloroethylene freezing liquid at a temperature of −48° F. The liquid slurries are supercooled and then frozen. The frozen structures are then removed from the mold while frozen, thawed and dried in a radiant heated oven at a temperature of about 120° F. No significant large voids were detected and the products after freezing were extremely uniform. After drying the structures are each fired in a conventional kiln at a temperature of 1250° C. for about 4 hours, after which the moldings were allowed to slowly cool to ambient temperature. The moldings were then subjected to heat and thermal shock by applications of a torch (about 6000° F.) directly to the moldings at ambient temperature. The moldings remained substantially unaffected after the application of heat with no visible or physical defects except for surface melting where the torch was was applied. Repeated tests such as those described above gave consistent and repeatable results.

EXAMPLE 5

60 parts by weight of magnesia (50%-14 mesh and 50%-48 mesh) were mixed with 12 parts by weight of a lithium stabilized 30% aqueous silica sol having a silica-lithium ratio of 85, formerly marketed by duPont under the designation Lithium Polysilicate 85. The mixture was supercooled and frozen in the same manner as set forth in the above examples. No initial reaction was noted and the pot life of the mix was very good.

EXAMPLE 6

60 Parts by weight of alumina (50%-28+48 mesh and 20%-325 mesh) were mixed together with 2.4 parts by weight of a lithium stabilized 30% aqueous silica sol having a silica-lithium ratio of 48, marketed by duPont under the designation Lithium Polysilicate 48, and 9.6 parts by weight of an ammonia stabilized 30% aqueous silica sol marketed by duPont under the designation Ludox AS-40 and the mixture supercooled and frozen in the same manner as set forth in the above examples.

EXAMPLE 7

Example 6 was repeated using 12 parts by weight of the ammonia stabilized sol and 0.025 parts by weight of a saturated solution of lithium hydroxide substituted for the lithium stabilized sol.

The thawed products can also be broken up into particles and then fired for various uses such as fillers for resins or plastics. The particles have a unique shape which is advantageous for use as fillers. A clay slurry, for example, was frozen, thawed, and dried according to this invention, broken up or ground into small particles; their shape was particularly suitable for filler particles. The jagged nature of these particles makes them particularly suited to mixing with small amounts of powdered thermoplastic or thermosetting resins to form, under heat and pressure, ceramic-like products such as roofing tiles.

The ice formed during the freezing in examples 5, 6 and 7 was much finer than the ice formed in examples 1-4. The unfired products were more uniform and were stronger than those produced in examples 1-4.

I claim:

1. A process of freezing an inorganic particulate aqueous slurry or suspension containing a freeze-sensitive colloidal ceramic sol which comprises supercooling the slurry in a freezing media and then freezing the slurry.

2. A process according to claim 1 in which the ceramic sol is a silica sol.

3. A process according to claim 1 in which the particulate slurry is a ceramic slurry.

4. A process according to claim 3 in which the ceramic is alumina, magnesia, zirconia, silica, zircon, mullite, uranium oxide, or clay.

5. A process according to claim 1, 2, 3 or 4 in which the particulate slurry contains lithium ions in a sufficient amount to inhibit ice crystal growth.

6. A process according to claims 1, 2, 3 or 4 in which the freezing media is a hydrophobic liquid.

7. A process according to claims 1, 2 3 or 4 in which the freezing media is hydrophobic and the particulate slurry is completely surrounded by the hydrophobic liquid.

8. A process for freezing an inorganic particulate aqueous slurry or suspension containing a freeze-sensitive ceramic colloidal sol which comprises treating a mold with a hydrophobic liquid to completely cover the working surface of the mold with the hydrophobic liquid, inserting the particulate slurry or suspension into the mold and in contact with the working surface thereof while the working suface is still wet with the hydrophobic liquid, reducing the temperature of the slurry to a sufficient degree to supercool the slurry, and thereafter freezing the supercooled slurry.

9. A process according to claim 8 in which the slurry or suspension contains lithium ions in an amount sufficient to inhibit large ice crystal growth.

10. A process according to claim 8 in which the temperature of the slurry is reduced in a freezing media and the freezing media is a hydrophobic liquid freezing media.

11. A process according to claim 10 in which the hydrophobic liquid and the hydrophobic liquid freezing media are the same.

12. A process according to claim 11 in which the hydrophobic liquids are freon or perchloroethylene.

13. A process for freezing an aqueous refractory particle slurry containing a freeze-sensitive colloidal ceramic sol which comprises treating a mold with a hydrophobic liquid to completely cover the working surface of the mold with the hydrophobic liquid, inserting the ceramic slurry into the mold in contact with the working surface while the working surface is still wet with the hydrophobic liquid, reducing the temperature of the slurry while the slurry is in contact with said working surface to a sufficient degree to supercool the slurry, and thereafter freezing the slurry.

14. A process according to claim 13 in which the mold contains the slurry on all sides except the top side, a hydrophobic liquid is placed on the slurry exposed at the top side in a sufficient amount to cover the slurry, a top closure placed on the mold top, and the slurry then supercooled and then frozen.

15. A process according to claim 13 in which the frozen slurry is removed from the mold, thawed, dried and fired.

16. A process according to claim 13 in which the aqueous slurry contains lithium ions in a sufficient amount to inhibit the growth of ice crystals.

17. A process according to claim 13 in which the temperature of the slurry is reduced in a freezing media and the freezing media is a hydrophobic liquid freezing media.

18. A process according to claim 17 in which the hydrophobic liquid and the hydrophobic liquid freezing media are the same.

19. A process according to claim 18 in which the hydrophobic liquids are freon or perchloroethylene.

20. A process of freezing an inorganic particulate slurry or suspension containing a freeze sensitive colloidial ceramic sol which comprises regulating or adjusting the relative zeta potentials of the particular particles and the sol particles to cause the sol particles to precipitate onto the surface of the particulate particles during the mixing of the particles.

21. A process according to claim 20 in which the inorganic particulate slurry contains magnesia or zirconia particles.

22. A process of freezing an inorganic particulate slurry or suspension containing a freeze sensitive ceramic sol which comprises freezing the slurry or suspension in the presence of lithium ions contained in the slurry or suspension in an amount sufficient to inhibit ice crystal growth.

23. A process according to claim 22 in which the slurry or suspension is supercooled before it is frozen.

* * * * *